United States Patent

Shenker et al.

[11] Patent Number: 4,793,687
[45] Date of Patent: * Dec. 27, 1988

[54] COLLIMATED OPTICAL VISUAL SIMULATION SYSTEM

[75] Inventors: Martin H. Shenker, Pomona; Joseph A. LaRussa, Yorktown Heights, both of N.Y.

[73] Assignee: Farrand Optical Co., Inc., Valhalla, N.Y.

[*] Notice: The portion of the term of this patent subsequent to Nov. 24, 2004 has been disclaimed.

[21] Appl. No.: 609,467

[22] Filed: May 11, 1984

[51] Int. Cl.⁴ ............................................. G02B 27/14
[52] U.S. Cl. .................................................... 350/174
[58] Field of Search ............... 350/174, 467, 609, 420; 434/38, 43, 44; 351/504, 505, 415

[56] References Cited

U.S. PATENT DOCUMENTS

| | | | |
|---|---|---|---|
| 3,071,875 | 1/1963 | Hemstret | 350/420 |
| 3,127,685 | 4/1964 | Ellison | 434/44 |
| 3,190,171 | 6/1965 | Reed | 350/505 |
| 3,281,519 | 10/1966 | Giordano | 434/44 |
| 3,785,715 | 1/1974 | Meeklenborg | 350/174 |
| 4,062,623 | 12/1977 | Suzuki et al. | 350/415 X |
| 4,232,943 | 11/1980 | Rogers | 350/174 |
| 4,383,740 | 5/1983 | Bordovsky | 350/504 |

Primary Examiner—John K. Corbin
Assistant Examiner—Vincent J. Lemmo
Attorney, Agent, or Firm—Handal & Morofsky

[57] ABSTRACT

An optical simulation system comprising a model (12) and collimating optics (16) is disclosed. An image is presented to an observer (32) by means of a plurality of lenses (24, 26) and mirrors optically alligned with the collimating optics. The optics of the system are adjustable so that the range changes of the model can be accommodated without moving large optical elements.

24 Claims, 2 Drawing Sheets

COLLIMATED OPTICAL VISUAL SIMULATION SYSTEM

TECHNICAL FIELD

The invention relates to a display system particularly useful for training persons such as aircraft pilots in tasks which require the assessment of visual data. In particular, the inventive system provides a simulation of the visual appearance of an aircraft which is proximate to the aircraft being piloted by the person being trained. The system disclosed is particularly useful for training pilots to pilot an aircraft during air-to-air refueling.

BACKGROUND OF THE INVENTION

Visual simulation for purposes of training is well-known in the art. For example, such simulation systems can take the form of a cathode ray tube which is projected against a half silvered mirror in front of the windscreen of a simulated aircraft cabin through an optical system which collimates the rays of light leaving the television screen, thereby making them appear to originate at a point very far from the observer. Such collimation is important in view of the fact that a directly viewed television picture will not appear realistic if the observer moves his head. In the case of head movement, the perceived image presented by such a television screen will appear to move. On the other hand, if collimation is used, the object will not appear to move any substantial distance and thus the impression of an object at a great distance will be created.

As an alternative, an actual model of the scene outside the windscreen of an aircraft can be placed outside the aircraft. Here, also, collimating optics must be used to create the proper sense of distance. However, an additional variable is introduced when such a model is used. In particular, the model's movements result in a change of range with respect to the observer. Accordingly, the optical system must be adjusted in order to continue acting as an effective collimator to scale up the apparent range.

The problems with respect to collimating rays of light from models generally stem from the fact that a collimating system, such as a concave mirror will only collimate light originating in its focal plane. Accordingly, if a model is moved substantially away from the focal plane of the collimating optics, the rays of light, instead of being parallel will converge or diverge depending upon whether the model appears before or after the focal plane of the collimating optical system. A solution to this problem is suggested in U.S. Pat. No. 3,190,171 of G. A. Reed. In this patent, the problem of collimating an object at different positions is solved by moving large focusing mirrors through which the object is viewed. In particular, Reed suggests moving the mirror directly in front of the observer. Apart from design problems which arise as a result of providing a realistic position for the windscreen and sufficient space for the mirror in front of the windscreen to move, such a structure poses the additional problem of alignment and the difficulty of moving large optical elements. If, in addition, it is desired to provide a simulator having dislays for a pilot and co-pilot, these problems are multiplied.

DISCLOSURE OF THE INVENTION

In accordance with the present invention, the aforementioned difficulties of the prior art have been eliminated. In particular, the invention provides a means for producing a collimated image of a model without the need for continuously adjusting the optics of the system to accomodate changes in the position of the simulated scene outside the windscreen. This is achieved through the use of a single optical array of relatively small size which may be adjusted to accomodate range changes in the model without requiring adjustment of the large optical elements which form the observer end of the simulator. Moreover, the same is achieved for simultaneous pilot and co-pilot display without multiplication of the collimating optics and, at the same time, requiring optical elements of practical size.

BRIEF DESCRIPTION OF THE DRAWINGS

The above and other objects and advantages of the invention will be described in detail below with respect to the drawings, which illustrate only one specific embodiment of the invention, in which.

BEST MODE FOR CARRYING OUT THE INVENTION

Figure 1:
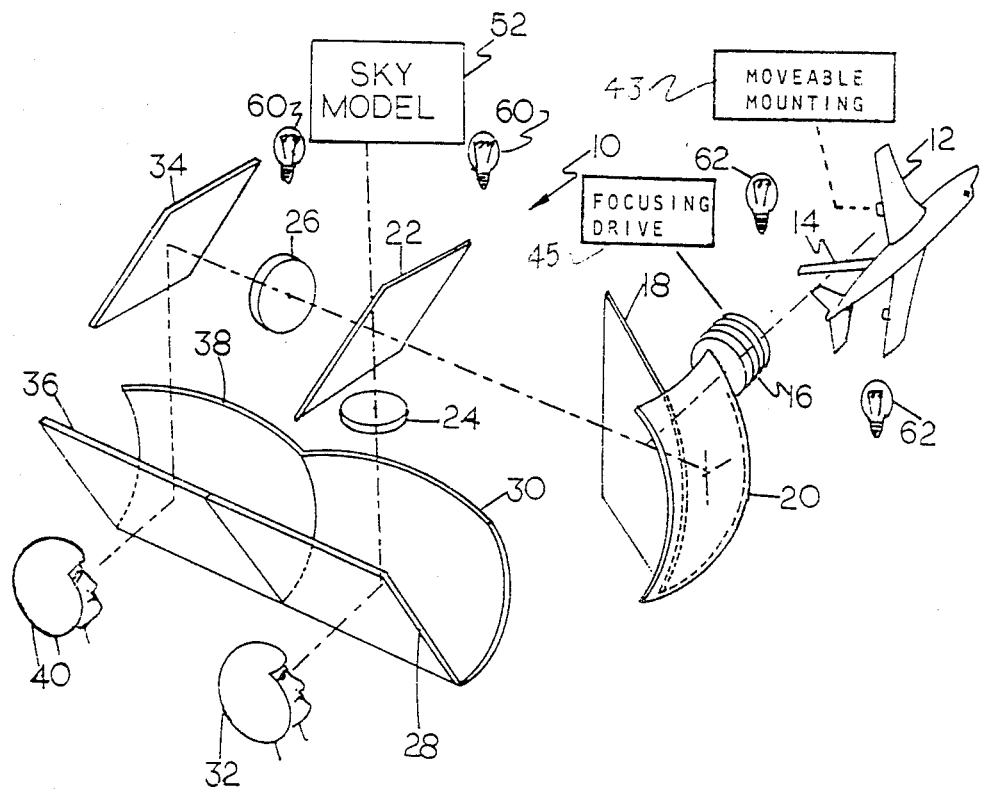
FIG. 1 is a perspective view of the principle elements of a simulator constructed in accordance with the present invention.

Referring to FIG. 1, a simulator 10 constructed in accordance with the present invention is illustrated. Simulator 10 includes a model 12, in this case of an aircraft which includes a tube 14 for refueling aircraft which the pilot operating the simulator 10 is using.

Light rays reflected from model 12 are collimated by collimator 16 which causes them to be substantially parallel and thus appear to be at a point much further from collimator 16 than they actually come from. It is noted that model 12 is of a scale of about 1/20 actual size.

Collimator 16 is an optical system which is, effectively, a convex lens with a variable focal length. If it is desired to make an object appear to be at infinity, the focal length is adjusted so that the object is placed in the focal plane of collimator 16. If it is desired to make the object appear to be at a point closer than infinity, the collimator is adjusted so that the object, in this case model 12, is placed at a point somewhat closer to collimator 16 than the focal point.

The light rays collimated by collimator 16 are then passed to a beamsplitter 18 which is simply a half-silvered mirror which reflects a portion of the light incident upon it against a concave mirror 20. Light incident on mirror 20 is reflected toward beamsplitter 22 which, in turn, reflects a portion of that light toward lens 24 and passes a portion of that light toward lens 26. Light which is incident on and passes through lens 24 is then incident on beamsplitter 28 from which it is reflected toward concave mirror 30 which focuses it for a right observer 32. On the other hand, light which is incident upon and passes through lens 26 is reflected onto mirror 34 which reflects the light onto beamsplitter 36 which, in turn, reflects the light onto concave mirror 38. Mirror 38 focuses the light for viewing by left observer 40.

Generally, the inventive simulator 10 may be analyzed as a pair of one power telescopes with optical trains which overlap over only a portion of their extent.

The region of overlap includes the objective concave mirror 20 and beamsplitter 18. The first of the one power telescopes comprises objective concave mirror 20, lens 24 and eye piece concave mirror 30. This three element optical system, often referred to as a "relay" can be broken down into a pair of telescopes whose power, when acting in series, is simply the product of the magnifications of each individual telescope. The first optical train which brings an image of model 12 to right observer 32 comprises objective concave mirror 20, beamsplitter 18, beamsplitter 22, convex lens 24, beamsplitter 28 and eye piece concave mirror 30.

Generally, when it is desired to present an image of model 12 to observer 32 the image is positioned at a point with respect to the entrance pupil of collimator 16 where its size will be the size of the desired object which is being simulated. Effectively the one power telescope through which observer 32 sees model 12 has the effect of moving the object to a point in space very close to the eyes of observer 32. In the typical case, model 12 will be approximately 5% of full scale. Accordingly, if one desires to simulate an aircraft at a distance of 100 feet, the model may be placed at an optical distance of approximately 5 feet from the observer. It would then have the same apparent size as a real aircraft 100 feet away. However, it would not have the same focus. This lack of proper focus exhibits itself physiologically in two different ways. First of all, the focus of the lens in each eye of the viewer would have to be set for focusing on an object that was relatively close as opposed to being set for focusing on an object 100 feet away. This would be detectable by the observer, inasmuch as objects which should not be in focus at five feet will be in focus when looking at the plane which should appear to be 100 feet away. This will degrade the simulation. Without collimating optics the image of model 12 which is perceived by an observer 32 will appear to move drastically in space when the observer moves his head. This is in contrast to objects at great distances which appear not to move at all or to move very little in response to head movement. This lack of proper angular "non-motion" is accomodated by collimator 16 which functions as a variable convex lens.

As discussed above, if an object is at infinity all light rays eminating from the object will approach an observer in substantially parallel directions. This can be achieved in the simplest case by a simple convex lens of fixed focal length, provided that the model is placed at the focal point of the lens. In the event that one wishes to show the object at a point closer than infinity, the model would be advanced toward the lens. However, such a solution, in order to work in the instant application would have to accommodate a plurality of model positions. A plurality of model positions is necessary because model position is used to achieve the desired scaling. Different model positions can, however, be accommodated by collimator 16 because collimator 16 effectively acts as a convex lens with a variable focal length. Thus, for the range of simulation situations, collimator 16 can be adjusted to place its focal length either coincident with model 12 or slightly beyond model 12 to achieve the desired angular subtense.

As discussed above, the optical train which presents an image of model 12 to observer 32 can be viewed as a pair of telescopes in tandem. Under this analysis, one of the telescopes comprises objective concave mirror 20 and eyepiece 24 while the other telescope comprises what may be viewed as objective 24 and eye piece 30. The objective and eyepiece functions of lens 24 may simply be combined in a single convex lens whose power is the sum of the powers of what would otherwise be the two lenses functioning respectively as eyepiece and objective of the two telescopes in tandem.

In accordance with the present invention, it has been found desirable to construct the telescopes which comprise the optical train serving observer 32 as approximately a two power telescope in tandem with a half power telescope. Considering the particular optical arrangement illustrated in FIG. 1, objective concave mirror 20 has a radius of curvature of 1981 mm. Thus its focal length is hal the radius of curvature or 990.5 mm. As discussed above, the first telescope is to have a power of one-half, its eyepiece must have a focal length of approximately 1981 mm.

In similar fashion, eyepiece mirror 30 has a radius of curvature of 1981 mm. Thus its objective should have a focal length of approximately 1981 mm. As discussed above, these two theoretical lenses can be combined in a single lens, namely, lens 24 which has a focal length of 990.5 mm.

Figure 2:
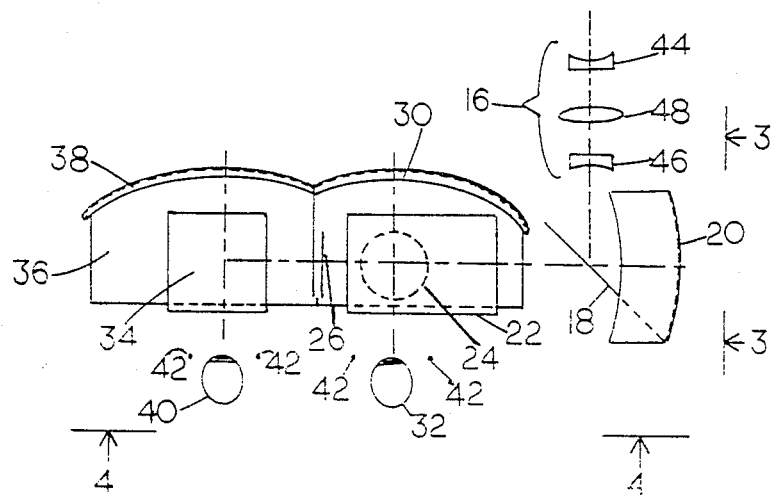
FIG. 2 is a top plan view of the inventive simulator.
Figure 4:
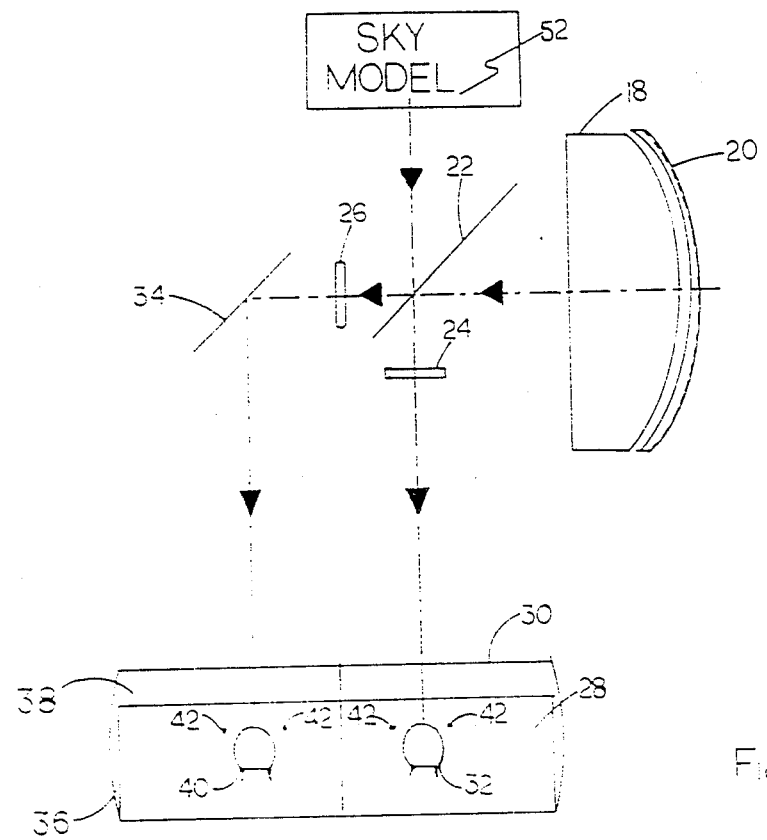
FIG. 4 is a rear plan view along lines 4—4 of FIG. 2.

The advantage of the use of a two power/half power relay is that the size of convex lens 24 is minimized when the system is used with a wide field of view. As is well known in the art, for any optical systems, the tangent of the field angle multiplied by the pupil diameter is a constant known as the optical invariant and must be met by all elements in the telescope. In the case of the instant one-power relay, the starting parameter is the field of view of collimator 16 and a requirement that the exit pupil through which the model 12 may be viewed by observer 32 is 254 mm. What this 254 mm figure means is that the observer 32 will see a proper image as long as his eyes stay within a 254 mm circle or pupil defined between points 42 in FIGS. 2 and 4.

Considering the requirements of the system at the model end of the telescope, the model 12 is of an airplane having a length of 2.8 meters and a wing span of 2.5 meters. The model moves, in response to a movement device 43 within a range varying from 1.3 meters to 6 meters from the entrance pupil of collimator 16. This position is determined by the scaling of the object which one wishes to present to observer 32. Likewise, the orientation of the aircraft is varied in accordance with the desired simulation. Inasmuch as one does not wish to move mirrors 20 or 30 in order to achieve an image of the model at apparent infinity, collimator 16 must therefor have an adjustable focal point which can be made by a focusing drive 45 to coincide with the model or be positioned slightly further from the collimator than the model. If this is achieved, it is then possible to maintain all mirrors and lenses in the remaining portion of the system stationary. Because of the size and positioning of the various mirrors, this is highly desirable. This objective is achieved by making collimator 16 from three separate lenses, namely, a pair of concave lenses 44 and 46 and a convex lens 48. (See FIG. 2). When it is desired to have a long focal length, concave lenses 44 and 46 are positioned very close to convex lens 48. On the other hand, if it is desired to have a very short focal length, concave lenses 44 and 46 are displaced equal distances at greater distances from convex lens 48. Convex lens 48 is maintained stationery with respect to the remaining optics in the system. In accordance with the preferred embodiment, concave lenses 44 and 46 have focal lengths of −970 mm and convex lens 48 has a focal length of 538.5 nm. The diameter of collimator 16 is approximately 660 mm.

The optical distance between the exit pupil of collimator 16 and mirror 20 is approximately 1463 mm. The optical distance between mirror 20 and lens 24 is approximately 2.5 meters. The optical distance between lens 24 and mirror 30 is approximately 2.82 meters. Finally, the diameter of lens 24 is approximately 660 mm. In accordance with the preferred embodiment. In order to obtain the desired angles of view, concave mirror 30 is approximately 1.2 meters by 1.8 meters.

In a case of observer 32, the model 12 is placed within an aperture with respect to collimator 16 which is defined within an angular range ±45° with respect to the optical axis of the collimator. The scale model is placed at a scale distance with respect to the collimator entrance pupil which gives it the desired picture. The collimator is then adjusted to put the focal point at a position with respect to the model where light rays emanating from the model will have the desired apparent subtense. If the model is believed to be at infinity or at very large distances approaching infinity the aircraft is substantially at the focal point of the collimator. Naturally, in order for the object size to appear correct the aircraft is at a relatively great distance from the collimator, typically on the order of 4 meters. If, on the other hand, it is desired to simulate an aircraft which is closer to the operator of the simulated cockpit, the aircraft is placed at a position close to collimator 16 and in between collimator 16 and its focal point which is set for a relatively small value.

The collimated light, which now has the proper angular subtense, exiting from collimator 16 then passes to beamsplitter 18 which acts as a planar mirror surface to reflect the image against a concave mirror 20. Light incident on concave mirror 20 is then focused by concave mirror 20 and a portion thereof is passed through beamsplitter 18 and a portion of this light is reflected by beamsplitter 22 which acts as a planar reflective surface toward lens 24 which focuses it onto mirror 30 via beamsplitter 28 which acts as a planar reflective surface. After being incident on concave mirror 30, the light is focused and a portion of it is passed through beamsplitter 28 to be viewed by the observer 32 in a simulated cockpit. As discussed above, the use of a two power telescope cascaded with a half power telescope changes the optical assembly of FIG. into a one power telescope with a collimator 16 as an input image source. The telescope thus has the effect of bringing an image of the model visually into the relatively small simulated cockpit in which the observer 32 is situated.

Figure 3:
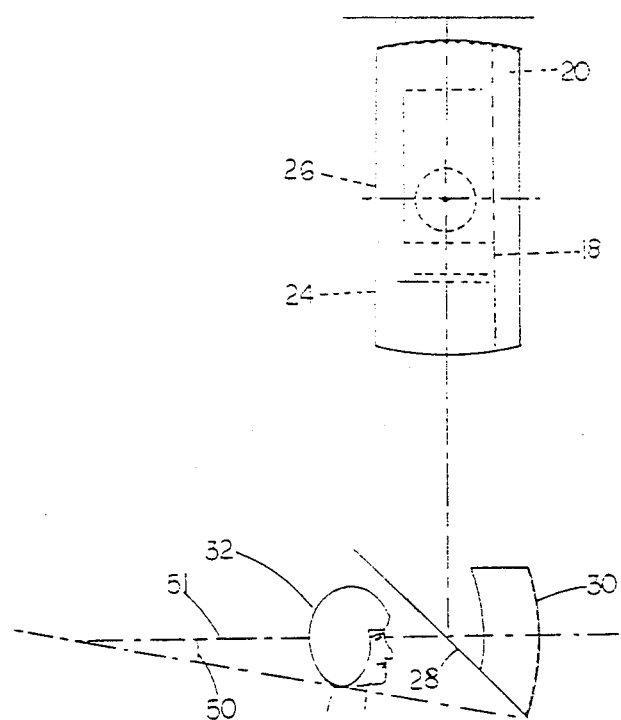
FIG. 3 is a side plan view of the inventive simulator along lines 3—3 of FIG. 2.

In accordance with the illustrated embodiment, the vertical angle of the optical system line of sight 51 at which the observer views the field of view may be varied according to the location of the field of interest. In this application the field of interest is above the observer so that the optical axis is tilted up on the order of 20°. Thus the entire assembly illustrated in FIGS. 1-4 may be tilted at an angle 50 as illustrated in FIG. 3.

Those portions of the simulator 10 which are used to bring the object to observer 40 are similar except for the differences in the focal lengths of the cascaded one power and two power telescopes. In particular, lens 26 has a focal length of 1399 mm and a diameter of 762 mm. Mirror 38 has a radius of curvature of 2319 mm and is approximately 1.2 meters by 1.8 meters in size. The distance between observer 40 and the vertex of mirror 38 is approximately 1509 mm, the same distance as between observer 32 and the vertex of mirror 30. The optical distance between mirror 20 and lens 20 is 4.16 meters. The optical distance between lens 26 and mirror 38 is three meters.

During operation of the inventive simulator, illumination reflected by model 12 is collimated by collimating optics 16 which transmits the rays in substantially parallel directions toward beamsplitter 18 which acts as a planar mirror deflecting these light rays against concave mirror 20. These light rays are then focused by concave mirror 20 and a portion of them are passed through beamsplitter 18 and beamsplitter 22 to lens 26 which focuses them and causes them to fall upon planar reflective mirror 34. These rays are then caused to reflect against beamsplitter 36 which acts as a planar reflective surface to be reflected upon mirror 38. Mirror 38 then focuses the light rays into an image for viewing by observer 40. A portion of the rays reflected by mirror 38 pass through beamsplitter 36 and are thus viewed as an apparent object by observer 40.

In the event that one wishes to add other elements to the simulation, they may be introduced through beamsplitter 22 and either passed toward lens 24 or reflected into lens 26. In particular, reference is made to FIG. 4 where additional model 52 is illustrated. This additional model may be one of the sky, fog, landscape, cloud deck or the like. In the case of a fog model, fog with the simulated aircraft at a distance can be simulated by increasing background illumination with lights 60 and dimming illumination of the model by lights 62. The aircraft can "emerge from the fog" by bringing the model of the aircraft closer to the collimator and increasing the intensity of lights 60 to simulate the increased visibility of a more proximate aircraft. It is noted that range is measured between the entrance pupil (lens 44) of the collimator and the model.

While an illustrated embodiment of the invention has been described in detail above, it is understood that various modifications and applications of the inventive concepts will be obvious to those of ordinary skill in the art. For example, if desired, the system could be fabricated for use by a single observer resulting in a great simplification of the apparatus. Such modifications are within the spirit and scope of the invention which is limited and defined only by the appended claims.

We claim:

1. An optical display system, comprising:
   (a) a model of an object whose visual appearance is to be simulated;
   (b) illuminating means for illuminating said model and causing it to emit rays of light;
   (c) collimating optics for receiving said rays emanating from said model;
   (d) means for moving said model to a desired position where its apparent scale as perceived by an observer looking through said collimating optics has a desired value;
   (e) means for adjusting the collimating optics to place the focal point of the collimating optics at a desired point with respect to the model; and
   (f) optical coupling means for conveying an image of said model to an observer, said optical coupling means having an optical axis which includes at least one fold, wherein said optical coupling means comprises a telescope having two optical trains with substantially the same magnification but having different path lengths for bringing an image of the model to two different observers in two different positions.

2. A system as in claim 1, wherein said collimating optics comprises a convex lens positioned between two concave lenses, and said collimating optics is adjusted by maintaining said convex lens stationary and increasing or decreasing, to the same extent, the distances between the two concave lenses and the convex lens.

3. A system as in claim 2, wherein each of said concave lenses has a flat surface and a curved surface, and the flat surface of each of said concave lenses faces said convex lens.

4. A system as in claim 3, wherein said convex lens is maintained at a fixed position with respect to said telescope.

5. A system as in claim 4, wherein the optical train of both of said telescopes is formed by a beamsplitter.

6. A system as in claim 5, wherein background information is introduced into both of said telescopes by said beamsplitter.

7. A system as in claim 6, wherein said background information emanates from a sky model and said system further comprises means for varying the amount of light emanating from said sky model and for adjusting the amount of light emanating from said model.

8. A system as in claim 1, wherein one of said optical trains comprises a first beamsplitter and a first concave mirror said first beamsplitter being oriented to receive light rays sent by said collimating optics and reflected to said first concave mirror and a second beamsplitter oriented to reflect light which is reflect the rays from said first concave mirror toward a first relay lens and a third beamsplitter oriented to receive light from said first relay lens and reflect the light against a second concave mirror for viewing by a first person; and said second optical train comprises said first concave mirror and said first beamsplitter and a second relay lens positioned to receive light reflected by said first concave mirror and passing through said second beamsplitter and a mirror positioned to receive light from said second relay lens and reflect the light against a fourth beamsplitter; and a fourth concave mirror positioned to receive light reflected by said fourth beamsplitter and direct an image toward a second observer.

9. A system as in claim 8, wherein a sky model is positioned to emit light through said second beamsplitter to said first relay lens and to reflect light against said second beamsplitter toward said second relay lens.

10. A system as in claim 9, wherein said sky model includes a fog model, a landscape model and a cloud deck model.

11. An optical display system, comprising:
(a) a model of an object whose visual appearance is to be simulated;
(b) illuminating means for illuminating said model and causing it to emit rays of light;
(c) collimating optics for receiving said rays emanating from said model;
(d) means for moving said model to a desired position where its apparent scale as perceived by an observer looking through said collimating optics has a desired value;
(e) means for adjusting the collimating optics to place the focal point of the collimating optics at desired point with respect to the model; and
(f) optical coupling means for conveying an image of said model to an observer, said optical coupling means having an optical axis which includes at least one fold, wherein said collimating optics comprises a convex lens positioned between two concave lenses, and said collimating optics is adjusted by maintaining said convex lens stationary and increasing or decreasing, to the same extent, the distances between the two concave lenses and the convex lens.

12. A system as in claim 11, wherein each of said concave lenses have a flat surface and a curved surface, and the flat surface of each of said concave lenses faces said convex lens.

13. An optical display system, comprising:
(a) a scale model of an object whose visual appearance is to be simulated;
(b) illuminating means for causing rays of light to emanate from said scale model;
(c) collimating optics for receiving said rays emanating from said model and varying the angular subtense of said rays;
(d) means for moving said model to a desired scales position where it apparent scale through said collimating optics has a desired value;
(e) means for adjusting the collimating optics to place the focal point of the collimating optics at a desired point with respect to the model; and
(f) optical coupling means for conveying an image of said model to an observer, said optical coupling means having an optical axis which includes at least one fold.

14. A system as in claim 13, wherein said optical coupling means comprises telescope means, said telescope means comprising a two power telescope in cascade with a one-half power telescope.

15. An optical display system, comprising:
(a) a scale model of an object whose visual appearance is to be simulated;
(b) illuminating means for causing rays of light to emanate from said model;
(c) collimating optics for receiving said rays emanating from said model, said collimating optics comprising a first collimating lens of power having a first sign positioned between two other lenses, each of said two other lenses having a power of opposite sign;
(d) means for moving said model to a desired scale position where its apparent scale as perceived by an observer looking through said collimating optics has a desired value;
(e) means for adjusting the collimating optics to place the focal point of the collimating optics at a desired point with respect to the model; and
(f) optical coupling means for conveying an image of said model to an observer, said optical coupling means having an optical axis which includes at least one fold.

16. A system as in claim 15, wherein said first collimating lens is a positive lens and said other lenses are negative lenses.

17. An optical display system, comprising:
(a) a model of an object whose visual appearance is to be simulated;
(b) illuminating means for illuminating said model and causing rays of light to emanate from said model;
(c) collimating optics for receiving said rays emanating from said model, said collimating optics comprising a first collimating lens of power having a first sign sandwiched between two other lenses each of said other lenses having a power of opposite sign;

(d) means for moving said model to a desired position where its apparent scale through said collimating optics has a desired value;

(e) means for adjusting the collimating optics to place the focal point of the collimating optics at a desired point with respect to the model; and (f) optical coupling means for conveying an image of said model to an observer, said optical coupling means having an optical axis which includes at least one fold, said optical coupling means, comprising:
  (i) first telescope means having a first power; and
  (ii) second telescope means having a second power, said second telescope means being positioned in cascaded with said firs telescope means, said first telescope means being adjacent said mold and said second telescope means having two halves with substantially the same magnification but having different path lengths and path positions for bringing an image of the model to two different observers in two different positions, said halves of said second telescope means each including reflective focusing members each positioned adjacent one of said observers.

18. An optical display system as in claim 17, wherein said first and second telescope means share a common refractive element for each of said telescope halves.

19. An optical display system as in claim 8 wherein said first telescope means comprises a reflective focusing member adjacent said model means.

20. An optical display system as in claim 17, wherein said second telescope means has a power different from the power of said first telescope means.

21. A system for simultaneous presentation of the same simulation to two observers, comprising:
  (a) a scale model positioned at a scaled distance for presenting a view of said scale model which is to appear as an object or scene to be simulated;
  (b) motive means for moving said scale model to a scaled position;
  (c) illumination means for causing light to emanate from said scale model;
  (d) first refractive optical means having a power of a first sign and positioned adjacent said model;
  (e) second refractive optical means positioned adjacent one side of said first optical means;
  (f) third refractive optical means positioned on the side of said first optical means opposite said one side of said first optical means, said second and third refractive optical means both having powers of the same opposite sign and said first, second, and third optical means comprising a refractive collimator having an optical axis for reducing subtense of the light which emanates from each point on said scale model;
  (g) motion means for moving each of said second and third optical means simultaneously toward said first optical means or simultaneously away from said first optical means in order to achieve a desired apparent distance for said scale model;
  (h) a first planar beamsplitter oriented at an acute angle with respect to an optical axis defined by said collimator means;
  (i) a first focusing reflective member, said first focusing reflective member together with said first beamsplitter defining a first folding subsystem, said first focusing reflective member positioned and oriented to receive rays of light emanating from said model and passed by said collimator means via said first beamsplitter and positioned and oriented to reflectively output light received via said first beamsplitter, light outputted form said first folding subsystem exiting in a direction transverse to said optical axis of said collimator means;
  (j) a second planar beamsplitter oriented to receive light rays outputted from said first folding subsystem and reflect a portion of said rays in a direction transverse to the plane defined by said optical axis of said collimator means and an optical axis defined by the output path of said first folding subsystem, said second beamsplitter also passing a portion of the rays reflected toward it by said first focusing reflective member;
  (k) a first relay lens positioned to receive rays of light reflected by said second beamsplitter for focusing rays of light reflected by said second beamsplitter;
  (l) a third planar beamsplitter positioned at an acute angle to an axis defined by said first relay lens;
  (m) a second focusing reflective member positioned to receive rays of light reflected by said third beamsplitter and focus said rays of light and reflect said rays of light in a direction through said third beamsplitter toward an observer positioned proximate said third beamsplitter;
  (n) second relay lens positioned and oriented along the axis defined by said first focusing reflective member and positioned to receive rays of light reflected by said first focusing reflective member and passed by said first and second beamsplitters;
  (o) a planar reflective member positioned at an acute angle with respect to the axis defined by said second relay lens and oriented to reflect rays of light transmitted from said second relay lens in generally the same direction as rays of light passing through said first relay lens;
  (p) a fourth planar beamsplitter oriented at an angle to the direction of light transmitted by said planar reflective member and generally in the same plane as said third beamsplitter means; and
  (q) a third focusing reflective member oriented to focus rays of light reflected by said fourth beamsplitter through said fourth beamsplitter to a second observer on the other side of said fourth beamsplitter; said first and second focusing reflective members together with said first relay lens forming a telescope with an entrance pupil and an exit pupil said exit pupil being wide enough to present the simulation to the two eyes of said first observer within a range of reasonable head movement; and said first and third focusing reflective members together with said second relay lens forming a second telescope with approximately the same magnifying power as said first telescope and having an entrance pupil and an exit pupil, said exit pupil being positioned beside the exit pupil of said first telescope and wide enough to present the simulation to the two eyes of said second observer within a reasonable range of head movement.

22. A system as in claim 21, wherein said scale model is a reproduction scale model of an aircraft with a refueling boom.

23. A system as in claim 21, wherein said illumination means is a lighting system whose intensity can be varied.

24. A system as in claim 23, wherein said first optical means is a convex lens.

* * * * *